US009168597B2

(12) United States Patent
Wiker et al.

(10) Patent No.: US 9,168,597 B2
(45) Date of Patent: Oct. 27, 2015

(54) TABLE SAW WITH FOLDABLE TABLETOP AND LEGS

(75) Inventors: Juergen Wiker, Schaumburg, IL (US); Ralph Dammertz, Palatine, IL (US)

(73) Assignee: Robert Bosch GmbH, Stuttgart (DE)

( * ) Notice: Subject to any disclaimer, the term of this patent is extended or adjusted under 35 U.S.C. 154(b) by 1028 days.

(21) Appl. No.: 13/273,993

(22) Filed: Oct. 14, 2011

(65) Prior Publication Data
US 2013/0092005 A1 Apr. 18, 2013

(51) Int. Cl.
B23D 47/02 (2006.01)
B25H 1/04 (2006.01)

(52) U.S. Cl.
CPC ............ B23D 47/025 (2013.01); B25H 1/04 (2013.01); *Y10T 83/773* (2015.04); *Y10T 83/7722* (2015.04)

(58) Field of Classification Search
CPC ........ B23D 45/00; B23D 45/06; B23D 47/00; B23D 47/02; B23D 47/025; B25H 1/00; B25H 1/02; B27B 5/16; Y10T 83/7722; Y10T 83/7684; Y10T 83/768; Y10T 83/95; Y10T 83/773
USPC ................ 83/477, 471, 469, 859, 477.2; 144/286.1, 286.5, 286.7
See application file for complete search history.

(56) References Cited

U.S. PATENT DOCUMENTS

| 3,036,608 | A | | 5/1962 | Weber |
| 4,860,807 | A | | 8/1989 | Vacchiano |
| 4,974,651 | A | * | 12/1990 | Carmon et al. ............ 144/286.1 |
| 5,479,972 | A | | 1/1996 | Keating et al. |
| 6,314,893 | B1 | * | 11/2001 | Lee ................................. 108/119 |
| 6,942,229 | B2 | * | 9/2005 | Brazell et al. .................... 280/30 |
| 6,948,539 | B1 | | 9/2005 | Barker et al. |
| 7,926,523 | B2 | | 4/2011 | Williams et al. |
| 2003/0075033 | A1 | * | 4/2003 | Speakman .................... 83/477.2 |
| 2004/0187666 | A1 | * | 9/2004 | Huang .......................... 83/477.2 |
| 2005/0034783 | A1 | * | 2/2005 | Laird .......................... 144/286.5 |
| 2009/0038459 | A1 | * | 2/2009 | Burch et al. .................... 83/520 |
| 2009/0133780 | A1 | * | 5/2009 | Lee ............................ 144/286.5 |

FOREIGN PATENT DOCUMENTS

| DE | 29515948 U1 | 3/1996 |
| EP | 1527848 A2 | 5/2005 |
| EP | 2075078 A2 | 7/2009 |

OTHER PUBLICATIONS

International Search Report in corresponding PCT Application (i.e., PCT/US2012/059220) completed Jan. 4, 2013 (11 pages).

* cited by examiner

*Primary Examiner* — Phong Nguyen
(74) *Attorney, Agent, or Firm* — Maginot Moore & Beck LLP

(57) ABSTRACT

Provided is a table saw assembly including a base portion, a saw blade opening, a saw assembly and a first leg assembly. The base portion includes a base work piece support surface which defines a support plane. The base portion includes a lower surface opposite the base work piece support surface. The saw blade opening is defined in the base work piece support surface. The saw assembly includes a saw blade which is positionable to extend upwardly through the saw blade opening. The first leg assembly includes a first foot portion. The first leg assembly is pivotable between a first position and a second position. In the first position, the first foot portion is positioned lower than the lower surface of the base portion. In the second position, the first foot portion is positioned above the lower surface of the base portion.

16 Claims, 5 Drawing Sheets

TABLE SAW WITH FOLDABLE TABLETOP AND LEGS

FIELD

This invention relates to tables saws and more specifically to table saws having reconfigurable workpiece support surfaces and foldable legs.

BACKGROUND

A typical table saw includes a cutting instrument, usually a saw blade, attached to a motor mounted beneath a work surface, commonly called a table. The table has an opening that allows a portion of the blade to extend therethrough. To make a cut, a user places material on the table and directs the material past the rotating blade.

A wide range of table saws are available for a variety of uses. Some table saws include only stationary rotating saw blades and other table saws allow for linear movement of the rotating saw blade along the surface of the table. In general, table saws are relatively large power tools which are, due to their size, difficult to handle and transport. They also require a lot of space when stored. Table saws with smaller table tops may be easier to transport and store, but they limit the size of the work surface and, thus, the utility of the saw.

In view of the foregoing, it would be advantageous to provide an improved table saw assembly. It would be advantageous if this table saw assembly is easier to carry, transport and store than conventional saws. It would also be advantageous if this table saw assembly provides the table top work surface area of a conventional large size table saw. It would also be advantageous of this table saw assembly includes foldable legs for an even smaller storage size. Additionally, it would be advantageous if, when folded, this table saw assembly included a protective area for the saw blade and the blade guard such that the saw blade and guard may not require removal or adjustment during transport to reduce the risk of injury or damage.

SUMMARY

In accordance with one embodiment of the disclosure, there is provided a table saw assembly including a base portion, a saw blade opening, a saw assembly and a first leg assembly. The base portion includes a base work piece support surface which defines a support plane. The base portion includes a lower surface opposite the base work piece support surface. The saw blade opening is defined in the base work piece support surface. The saw assembly includes a saw blade which is positionable to extend upwardly through the saw blade opening. The first leg assembly includes a first foot portion. The first leg assembly is pivotable between a first position and a second position. In the first position, the first foot portion is positioned lower than the lower surface of the base portion. In the second position, the first foot portion is positioned above the lower surface of the base portion.

In accordance with another embodiment of the disclosure, there is provided a table saw assembly including a base portion, a saw blade opening, a saw assembly, and a first leg assembly. The base portion includes an upper base work piece support surface which defines a support plane and a first lower most portion. The saw blade opening is defined in the base work piece support surface. The saw assembly includes a saw blade which is positionable to extend upwardly through the saw blade opening. The first leg assembly includes a second lower most portion. The first leg assembly is pivotable between a first position and a second position. In the first position, the second lower most portion is positioned lower than the first lower most portion. In the second position, the second lower most portion is positioned above the support plane.

The above described features and advantages, as well as others, will become more readily apparent to those of ordinary skill in the art by reference to the following detailed description and accompanying drawings. While it would be desirable to provide a table saw with a table top that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
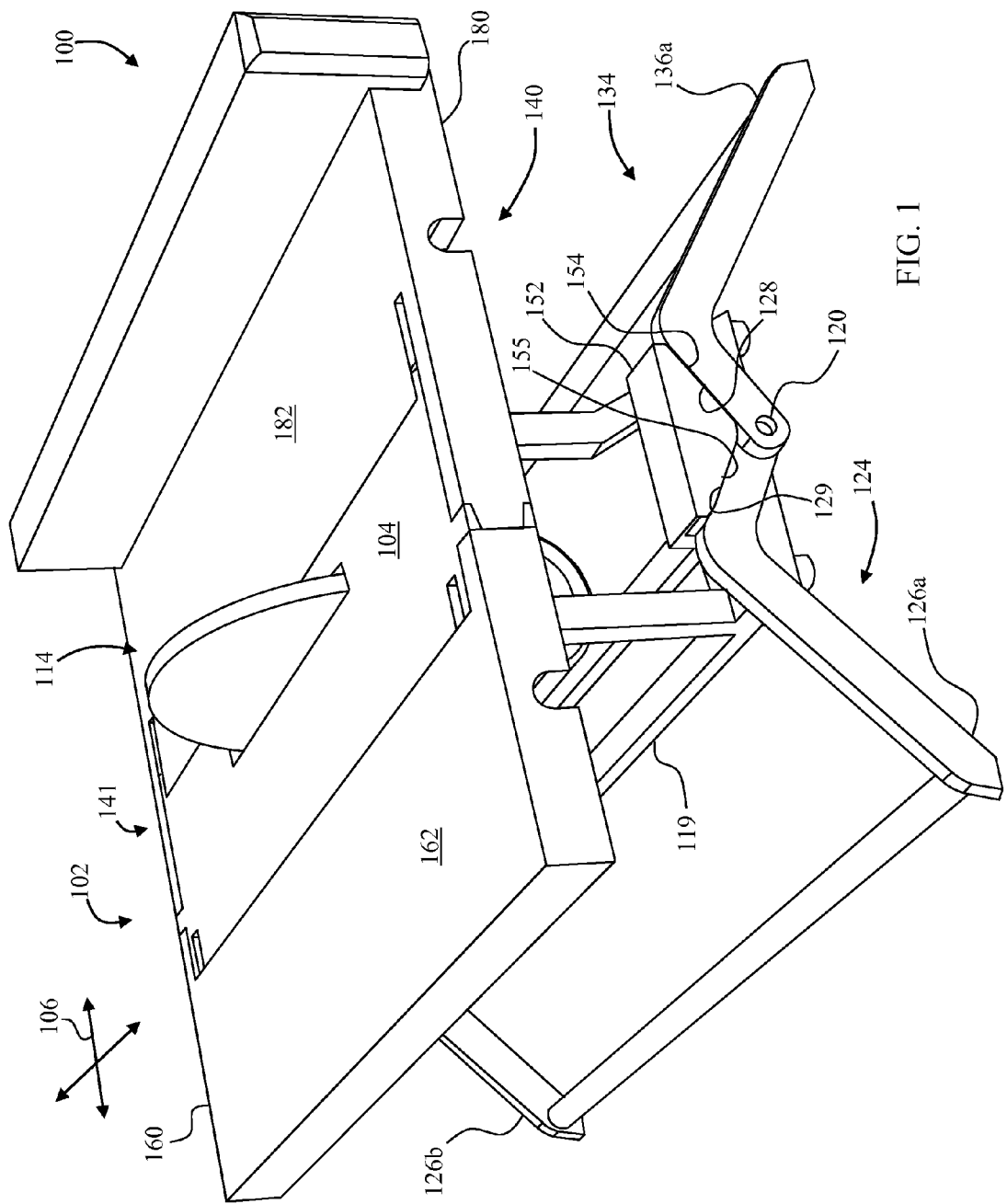
FIG. 1 depicts a top left perspective view of a table saw assembly including a base portion, leg assemblies and extensions in accordance with the principles of the invention.

FIG. 1 depicts a table saw assembly 100 including a base portion 102, a first leg assembly 124, a second leg assembly 134, an extension 160 and an extension 180. The base portion 102 includes a base work piece support surface 104 and a saw blade assembly 114. The leg assemblies 124, 134 are coupled to the base portion 102 by pivots 120 which are configured to allow the leg assemblies 124, 134 to rotate relative to the base portion 102. The extensions 160, 180 are coupled to the base portion 102 by connection assemblies 140 which are configured to allow the extensions 160, 180 to slide and rotate relative to the base portion 102.

Figure 2:
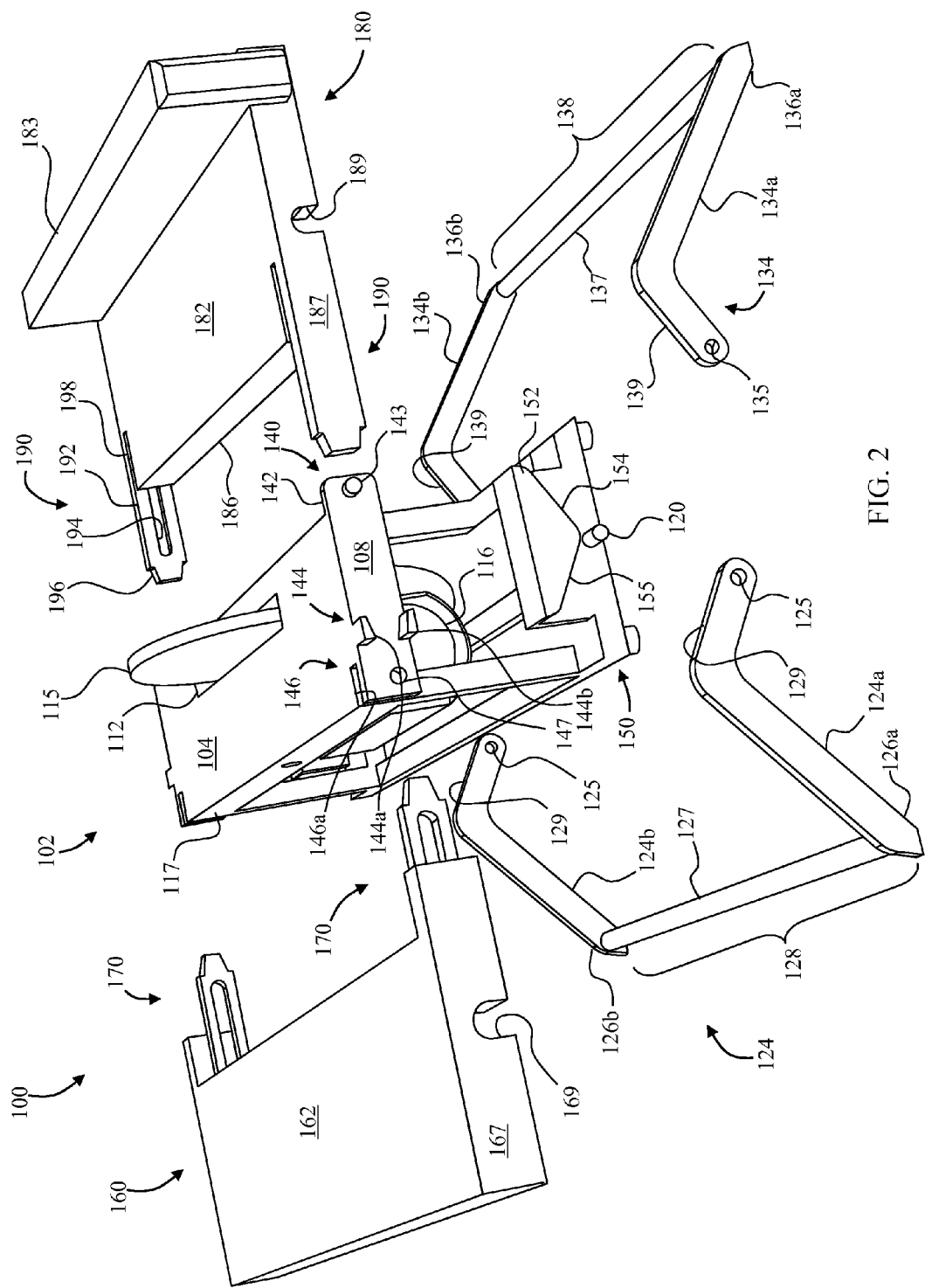
FIG. 2 depicts an exploded view of the table saw assembly of FIG. 1 from the top, front, right perspective.

As shown in FIG. 2, the base portion 102 includes a base work piece support surface 104 defining a support plane 106. The base work piece support surface 104 defines a saw blade opening 112 which passes through the base portion 102. The saw blade assembly 114 includes a saw blade 115 and a motor 116. The saw blade 115 is positioned to extend upwardly through the saw blade opening 112 of the base portion 102.

Figure 3:
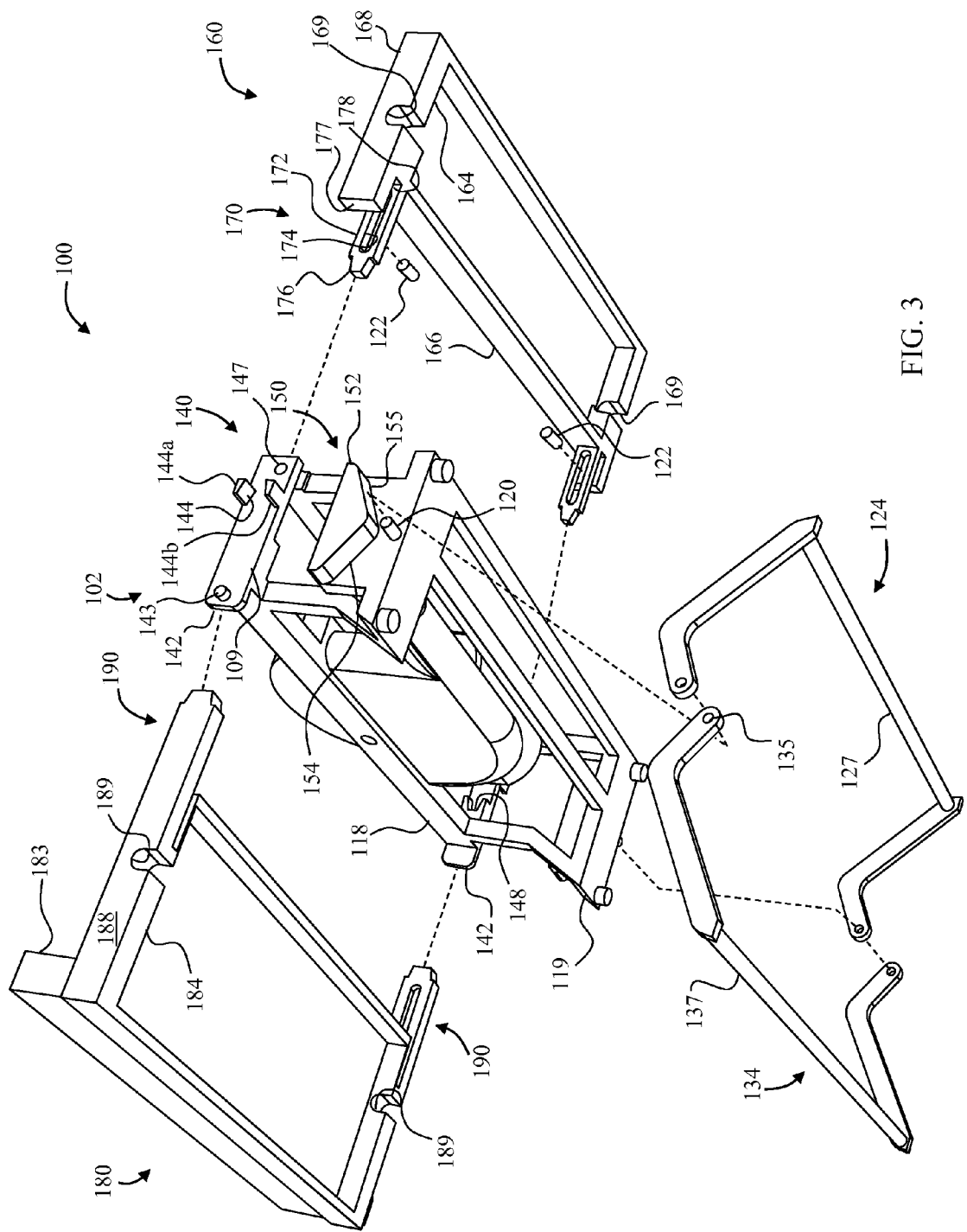
FIG. 3 depicts an exploded view of the table saw assembly of FIG. 1 from the bottom, back, left perspective.

The base portion 102 also includes a front side surface 108 and a back side surface 109 (shown in FIG. 3), a left lateral surface 117 and a right lateral surface 118 (shown in FIG. 3), and a lower surface 119 (shown in FIG. 3). The side surfaces 108, 109 are on opposing sides of the base portion 102 and are perpendicular to the base work piece support surface 104. The lateral surfaces 117, 118 are on opposing sides of the base portion 102 and are perpendicular to the side surfaces 108, 109 as well as the base work piece support surface 104. The lower surface 119 is opposite the base work piece support surface 104 and is parallel to the support plane 106.

Referring to FIGS. 2 and 3, the base portion 102 also includes the pivots 120 located on opposing sides of the base portion 102. The base portion 102 also includes the connection assemblies 140 which are located on opposing sides of the base portion 102. The base portion 102 also includes a stop mechanism 150 consisting of stop blocks 152 positioned on opposing sides of the base portion 102.

The pivots 120 are located on the same side of the base portion 102 as side surfaces 108, 109. Each pivot 120 is in the form of a pin projecting outwardly from the base portion 102 in a direction parallel with the support plane 106 and perpendicular to the side surfaces 108, 109.

Each connection assembly 140 includes a connection tab 142, a connection pin 143, a raised channel 144, a connection slot 146 (shown in FIG. 2) and a connection hole 147. The connection tabs 142 extend rightwardly along the side surfaces 108, 109 and extend farther than the lateral surface 118 (shown in FIG. 3) of the base portion 102. The connection tabs 142 extend in a direction perpendicular to the lateral surface 118 and parallel to the base work piece support surface 104. The connection pins 143 protrude outwardly from the connection tab 142 in a direction parallel with the pivots 120 and perpendicular to the side surfaces 108, 109.

The raised channel 144 consists of an upper raised channel portion 144a and a lower raised channel portion 144b which protrude outwardly from the side surfaces 108, 109 of the base portion 102 and extend in a direction parallel to the connection pins 143. The raised channel 144 is wider nearer to the right lateral surface 118 and narrower nearer to the left lateral surface 117. Thus, the upper raised channel portions 144a and the lower raised channel portions 144b are closer together nearer to the left lateral surface 117 and are farther apart nearer to the right lateral surface 118.

As shown in FIG. 2, the connection slots 146 extend inwardly from the lateral surface 117 and include outer connection slot walls 146a spaced apart from the lateral surface 117. The holes 147 extend through the outer connection slot walls 146a from the side surfaces 108, 109 to the connection slots 146 in a direction parallel to the connection pins 143.

With reference now to FIG. 3, the base portion 102 further includes connection notches 148 located beneath the base work piece support surface 104 on opposing sides of the base portion 102. The connection notches 148 are located opposite the side surfaces 108 (shown in FIG. 2), 109 and open toward the left lateral surface 117 (shown in FIG. 2). The connection notches 148 are accessible through and aligned with the connection slots 146 (shown in FIG. 2).

Shown in FIGS. 2 and 3, the stop mechanism 150 is in the form of stop blocks 152 located on front and back of the base portion 102 and protruding outwardly in a direction perpendicular to the side surfaces 108, 109. Each stop block 152 includes a stop surface 154 and a stop surface 155. The stop surfaces 154 are angled upwardly and away from approximately the center of the bottom of the base portion 102 toward the right lateral surface 118. The stop surfaces 155 are angled upwardly and away from approximately the center of the bottom of the base portion 102 toward the left lateral surface 117.

Returning to FIG. 2, the leg assembly 124 includes a front leg 124a, a back leg 124b, pivot holes 125, a front foot 126a, a back foot 126b, a cross bar 127 and leg support surfaces 129. The front leg 124a and the back leg 124b are identical to one another and are on opposite sides of the leg assembly 124. A pivot hole 125 is located on each of the front leg 124a and the back leg 124b of the leg assembly 124. The pivot holes 125 are sized and configured to receive the pivots 120 on the base portion 102 such that the leg assembly 124 is pivotable with respect to the base portion 102 about the pivots 120. The front foot 126a is located on the bottom of the front leg 124a and the back foot 126b is located on the bottom of the back leg 124b of the leg assembly 124. The cross bar 127 connects the front leg 124a and the back leg 124b of the leg assembly 124.

The cross bar 127 is connected to the end portions of the front leg 124a and the back leg 124b opposite the end portions including the pivot holes 125. The cross bar 127 has a cross bar length 128. The leg support surfaces 129 are located near the pivot holes 125 on the front leg 124a and the back leg 124b of the leg assembly 124. The leg support surfaces 129 are configured such that they are able to contact and lay flat on the stop surfaces 155 of the stop blocks 152 of the stop mechanism 150 on the base portion 102.

Continuing to refer to FIG. 2, the leg assembly 134 includes a front leg 134a, a back leg 134b, pivot holes 135, a front foot 136a, a back foot 136b, a cross bar 137 and leg support surfaces 139. The front leg 134a and the back leg 134b are identical to one another and are on opposite sides of the leg assembly 134. The front leg 134a and back leg 134b of leg assembly 134 are shorter than the front leg 124a and back leg 124b of leg assembly 124. A pivot hole 135 is located on each of the front leg 134a and the back leg 134b of the leg assembly 134. The pivot holes 135 are sized and configured to receive the pivots 120 on the base portion 102 such that the leg assembly 134 is pivotable with respect to the base portion 102 about the pivots 120 when assembled as shown in FIG. 1. The front foot 136a is located on the bottom of the front leg 134a and the back foot 136b is located on the bottom of the back leg 134b of the leg assembly 134.

The cross bar 137 connects the front leg 134a and the back leg 134b of the leg assembly 134. The cross bar 137 is connected to the end portions of the front leg 134a and the back leg 134b opposite the end portions including the pivot holes 135. The cross bar 137 has a cross bar length 138. The cross bar length 138 of cross bar 137 of the leg assembly 134 is greater than the cross bar length 128 of cross bar 128 of the leg assembly 124. The leg support surfaces 139 are located near the pivot holes 135 on the front leg 134a and the back leg 134b of the leg assembly 134. The leg support surfaces 139 are configured such that they are able to contact and lay flat on the stop surfaces 154 of the stop blocks 152 of the stop mechanism 150 on the base portion 102.

Referring again to FIGS. 2 and 3, the extension 160 includes an extension work piece support surface 162 (shown in FIG. 2), a lower surface 164 (shown in FIG. 3), a lateral surface 166 (shown in FIG. 3), side surfaces 167 and 168, leg assembly reception areas 169 and connection portions 170. The lower surface 164 is opposite and parallel to the extension work piece support surface 162. The lateral surface 166 is perpendicular to the extension work piece support surface 162 and the lower surface 164. The side surfaces 167, 168 are perpendicular to the extension work piece support surface 162, the lower surface 164 and the lateral surface 166.

Referring now to FIG. 3, the leg assembly reception areas 169 are provided on opposite sides of the extension 160. The leg assembly reception areas 169 extend upwardly into the extension 160 from the lower surface 164 and extend through the side surfaces 167 (shown in FIG. 2) and 168. The leg assembly reception areas 169 are open toward the lower surface 164. The leg assembly reception areas 169 are sized and configured to receive the cross bar 137 of leg assembly 134.

Continuing to refer to FIG. 3, the connection portions 170 extend outwardly from and perpendicularly to the lateral surface 166. Each connection portion 170 includes a connection bar 172, an open slot 174, an angled portion 176, a connection portion outer wall 177 and a connection gap 178. The connection portions 170 are spaced apart from one another and terminate with the side surfaces 167 (shown in FIG. 2) and 168. The connection bars 172 are spaced apart from one another and are closer together than the side surfaces 167, 168. The connection bars 172 extend perpendicularly from the lateral surface 166. Each connection bar 172 defines an open slot 174 which passes through the connection bars 172 in a direction parallel to the lateral surface 166 and perpendicular to the side surfaces 167, 168. Each connection bar 172 also includes an angled portion 176 which is located on the connection bar 172 at an end portion opposite that where the connection bar 172 is coupled to the lateral surface 166. The connection portion outer walls 177 are spaced apart from the connection bars 172 by connection gaps 178. The connection portion outer walls 177 are coextensive with side surfaces 167 (shown in FIG. 2) and 168.

Referring again to FIGS. 2 and 3, the extension 180 includes an extension work piece support surface 182 (shown in FIG. 2), a rip fence 183, a lower surface 184 (shown in FIG. 3), a lateral surface 186 (shown in FIG. 2), side surfaces 187 (shown in FIG. 2) and 188 (shown in FIG. 3), leg assembly reception areas 189 and connection portions 190. The rip fence 183 extends outwardly from and perpendicularly to the extension work piece support surface 182. The lower surface 184 is opposite and parallel to the extension work piece support surface 182. The lateral surface 186 is perpendicular to the extension work piece support surface 182 and the lower surface 184. The side surfaces 187, 188 are perpendicular to the extension work piece support surface 182, the lower surface 184 and the lateral surface 186.

As shown in FIG. 3, the leg assembly reception areas 189 are provided on opposite sides of the extension 180. The leg assembly reception areas 189 extend upwardly into the extension 180 from the lower surface 184 and extend through the side surfaces 187 (shown in FIG. 2) and 188. The leg assembly reception areas 189 are open toward the lower surface 184. The leg assembly reception areas 189 are sized and configured to receive the cross bar 127 of leg assembly 124.

Referring again to FIG. 2, the connection portions 190 extend outwardly from and perpendicularly to the lateral surface 186. Each connection portion 190 includes a connection bar 192, a closed slot 194, an angled portion 196 and a connection gap 198. The connection portions 190 include connection bars 192, which are spaced apart from one another and terminate at the side surfaces 187 and 188 (shown in FIG. 3). The closed slots 194 are located on the connection bars 192 opposite the side surfaces 187 and 188 (shown in FIG. 3). The closed slots 194 do not pass completely through the connection bars 192, but extend into the connection bars 192 in a direction parallel to the lateral surface 186 and perpendicular to the side surfaces 187 and 188 (shown in FIG. 3). The angled portions 196 are located on the connection bars 192 at end portions opposite those where the connection bars 192 are coupled to the lateral surface 186. The connection gaps 198 extend inwardly from the lateral surface 186 and are adjacent to the support bars 192.

The table saw assembly 100 may be used to cut work pieces when the table saw assembly 100 is in a deployed configuration as shown in FIG. 1. In the deployed configuration, the extensions 160, 180 are coupled to the base portion 102 such that the extension work piece support surfaces 162, 182 are coplanar with the base work piece support surface 104. Additionally, the leg assemblies 124, 134 are positioned to support the base portion 102. Thus, when the table saw assembly 100 is in the deployed configuration, a work piece can be supported simultaneously by the extension work piece support surface 162, the base work piece support surface 104 and the extension work piece support surface 182.

When the table saw assembly 100 is arranged in the deployed configuration (as shown in FIG. 1), the lateral surface 166 of the extension 160 is in opposition to and abutting the left lateral surface 117 of the base portion 102 (shown in FIG. 2). The connection portions 170 of the extension 160 (shown in FIG. 3) mate with the connection assemblies 140 of the base portion 102 (shown in FIGS. 2 and 3) such that the extension 160 is locked in position relative to the base portion 102. In particular, the connection bars 172 of the connection portion 170 (shown in FIG. 3) are received within the connection slots 146 of the connection assemblies 140 (shown in FIGS. 2 and 3). The open slots 174 of the connection portions 170 (shown in FIG. 3) are aligned with the holes 147 (shown in FIGS. 2 and 3) of the connection assemblies 140 such that pins 122 (shown in FIG. 3) slidably couple the extension 160 to the base portion 102 by extending simultaneously through the open slots 174 and the holes 147. The outer connection slot walls 146a of the connection assemblies 140 (shown in FIGS. 2 and 3) are received within the connection gaps 178 of the connection portions 170 (shown in FIG. 3). Additionally, the angled portions 176 of the connection portions 170 (shown in FIG. 3) are received within the connection notches 148 of the connection assemblies 140 (shown in FIG. 3). The angled portions 176 and the connection notches 148 are configured with complementary shapes and sizes such that the angled portions 176 and the connection notches 148 mate when the extension 160 is coupled to the base portion 102. The mating of the angled portions 176 with the connection notches 148 retains the extension 160 in a position such that the work piece support surface 162 is coplanar with the base work piece support surface 104 (as shown in FIG. 1).

When the table saw assembly 100 is in the deployed configuration, the lateral surface 186 of the extension 180 (shown in FIG. 2) is in opposition to and abutting the right lateral surface 118 of the base portion 102 (shown in FIG. 3). The connection portions 190 of the extension 180 (shown in FIG. 2) mate with the connection assemblies 140 (shown in FIGS. 2 and 3) of the base portion 120. In particular, the connection bars 192 (shown in FIG. 2) are in opposition to and abutting the side surfaces 108 (shown in FIG. 2) and 109 (shown in FIG. 3). The connection tabs 142 of the connection assemblies 140 (shown in FIGS. 2 and 3) are received within the connection gaps 198 of the connection portions 190 (shown in FIGS. 2 and 3). The connection pins 143 (shown in FIGS. 2 and 3) are received within the closed slots 194 (shown in FIG. 2) such that the extension 180 is coupled to the base portion 102. The extension 180 is coupled to the base portion 102 such that it is both slidable and pivotable relative to the base portion 102 about the connection pins 143. Additionally, the angled portions 196 (shown in FIG. 2) are received within the raised channels 144 (shown in FIGS. 2 and 3). The angled portions 196 and the raised channels 144 are configured with complementary shapes and sizes such that the angled portions 196 and the raised channels 144 mate when the extension 180 is coupled to the base portion 102. The mating of the angled portions 196 with the raised channels 144 retains the extension 180 in a position such that the extension work piece support surface 182 is coplanar with the base work piece support surface 104 (as shown in FIG. 1).

Returning to FIG. 1, when the table saw assembly 100 is in the deployed configuration, the leg assembly 124 is positioned relative to the base portion 102 such that the leg support surfaces 129 of leg assembly 124 are in opposition to and abutting the stop surfaces 155 of the stop blocks 152. Similarly, the leg assembly 134 is positioned relative to the base portion 102 such that the leg support surfaces 139 of the leg assembly 134 are in opposition to and abutting the stop surfaces 154 of the stop blocks 152. When the table saw assembly 100 is in the deployed configuration, the front foot 126a and the back foot 126b of the leg assembly 124 are lower than the lower surface 119 (shown in FIG. 3) of the base portion 102 such that the leg assembly 124 is supporting the base portion 102. Similarly, the front foot 136a and the back foot 136b (shown in FIG. 2) are lower than the lower surface 119 (shown in FIG. 3) of the base portion 102 such that the leg assembly 134 is supporting the base portion 102.

Figure 4:
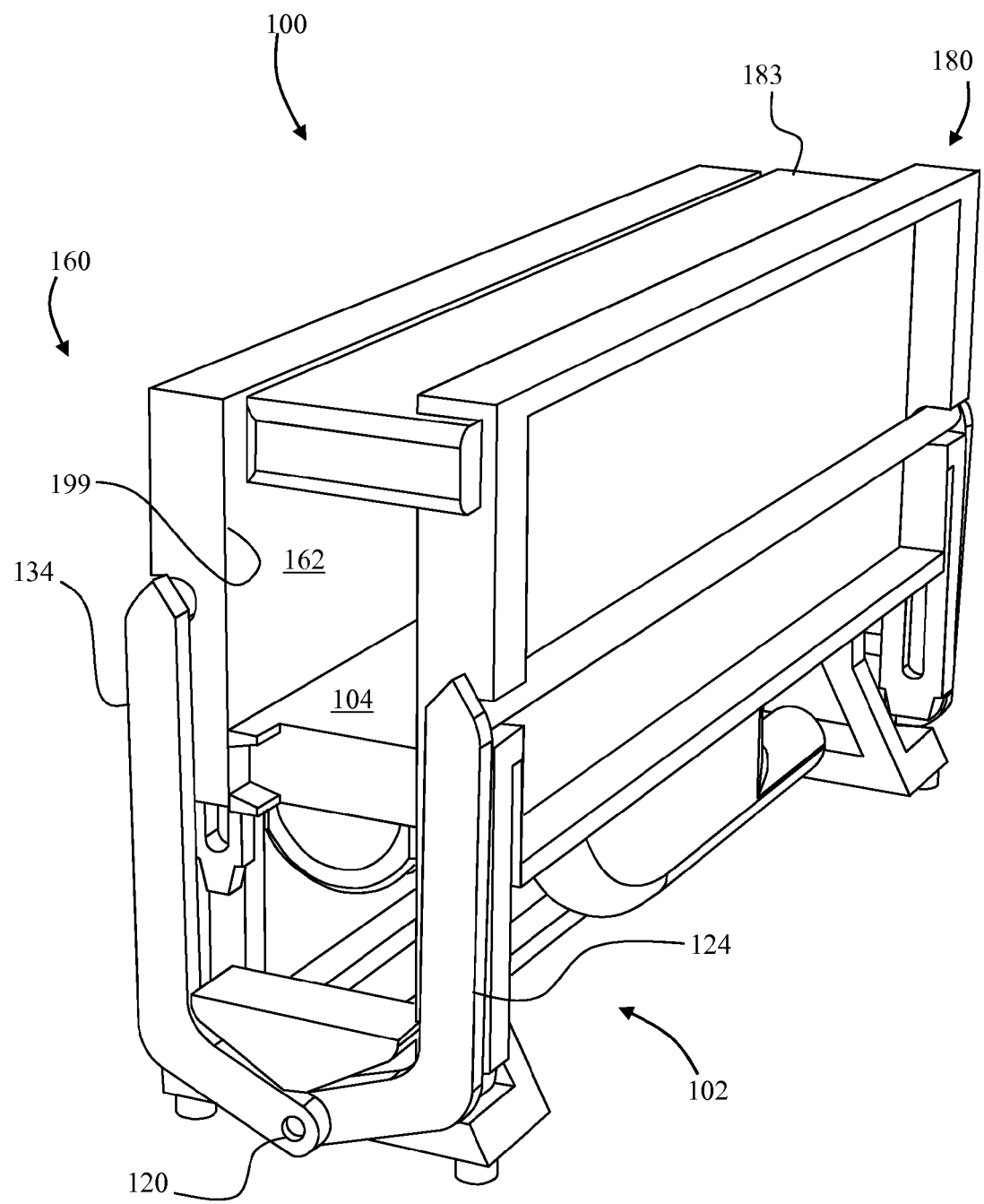
FIG. 4 depicts a top right perspective view of the table saw assembly of FIG. 1 in a stowed configuration.

When the table saw assembly 100 is not needed to cut a work piece, it can be in a stowed configuration. As shown in FIG. 4, when the table saw assembly 100 is in the stowed configuration, the extensions 160, 180 are rotated relative to the base portion 102 such that the extension work piece support surfaces 162 and 182 (shown in FIG. 2) are no longer coplanar with the base work piece support surface 104. Additionally, the leg assemblies 124, 134 are rotated relative to the base portion 102 such that the front foot 126a and the back foot 126b of the leg assembly 124 (shown in FIG. 2) and the front foot 136a and the back foot 136b of the leg assembly 134 (shown in FIG. 2) are positioned above the support plane 106 of the base portion 102. Thus, when the table saw assembly 100 is in the stowed configuration, a work piece cannot be supported by the extension work piece support surfaces 162, 182 and the base portion 102 is not supported by the leg assemblies 124, 134.

When the table saw assembly 100 is in the stowed configuration, the extension work piece support surfaces 162, 182 are in opposition to and are spaced apart from one another. The extension work piece support surfaces 162, 182 are also spaced apart from the saw blade 115 (shown in FIG. 2) such that the extension work piece support surfaces 162, 182 form a saw blade and guard protection cavity 199. The rip fence 183 is positioned above the base work piece support surface 104 such that it forms a top portion of the blade and guard protection cavity 199. When the table saw assembly 100 is in the stowed configuration, the saw blade 115 is positioned such that at least a portion of the saw blade 115 extends into the saw blade and guard protection cavity 199. While the blade guard is not shown in the drawings, a standard table saw blade guard can be used with the saw and fit into the blade and guard protection cavity 199.

The table saw assembly 100 is moved from the deployed configuration (shown in FIG. 1) to the stowed configuration (shown in FIG. 4), by first sliding the extension 160 to the left relative to the base portion 102. The open slots 174 of the connection bars 172 (shown in FIG. 3) slide along the pins 122 (shown in FIG. 3) removing the angled portions 176 of the connection bars 172 (shown in FIG. 3) from the connection notches 148 of the connection assemblies 140 (shown in FIG. 3) on the base portion 102. The open slots 174 of the connection bars 172 (shown in FIG. 3) are then free to pivot about the pins 122 (shown in FIG. 3) allowing the extension 160 to pivot upwardly and inwardly relative to the base portion 102 into a vertical position and then slide downwardly relative to the base portion 102 until the lateral surface 166 rests on top of the base work piece support surface 104.

Returning to FIG. 4, the extension 180 is then rotated relative to the base portion 102 in a similar manner as extension 160. The closed slots 194 of the connection bars 192 (shown in FIG. 2) slide to the right along the connection pins 143 of the connection assemblies 140 (shown in FIGS. 2 and 3) removing the angled portions 196 of the connection bars 192 (shown in FIG. 2) from the raised channels 144 of the connection assemblies 140 (shown in FIGS. 2 and 3). The closed slots 194 (shown in FIG. 2) are then free to pivot about the connection pins 143 (shown in FIGS. 2 and 3) allowing the extension 180 to pivot upwardly and inwardly relative to the base portion 102 into a vertical position and then slide downwardly relative to the base portion 102 such that the extension work piece support surface 182 slides along the lateral surface 118 until the ends of the connection gaps 198 rest on the top surface of the connection tabs 142.

Figure 5:
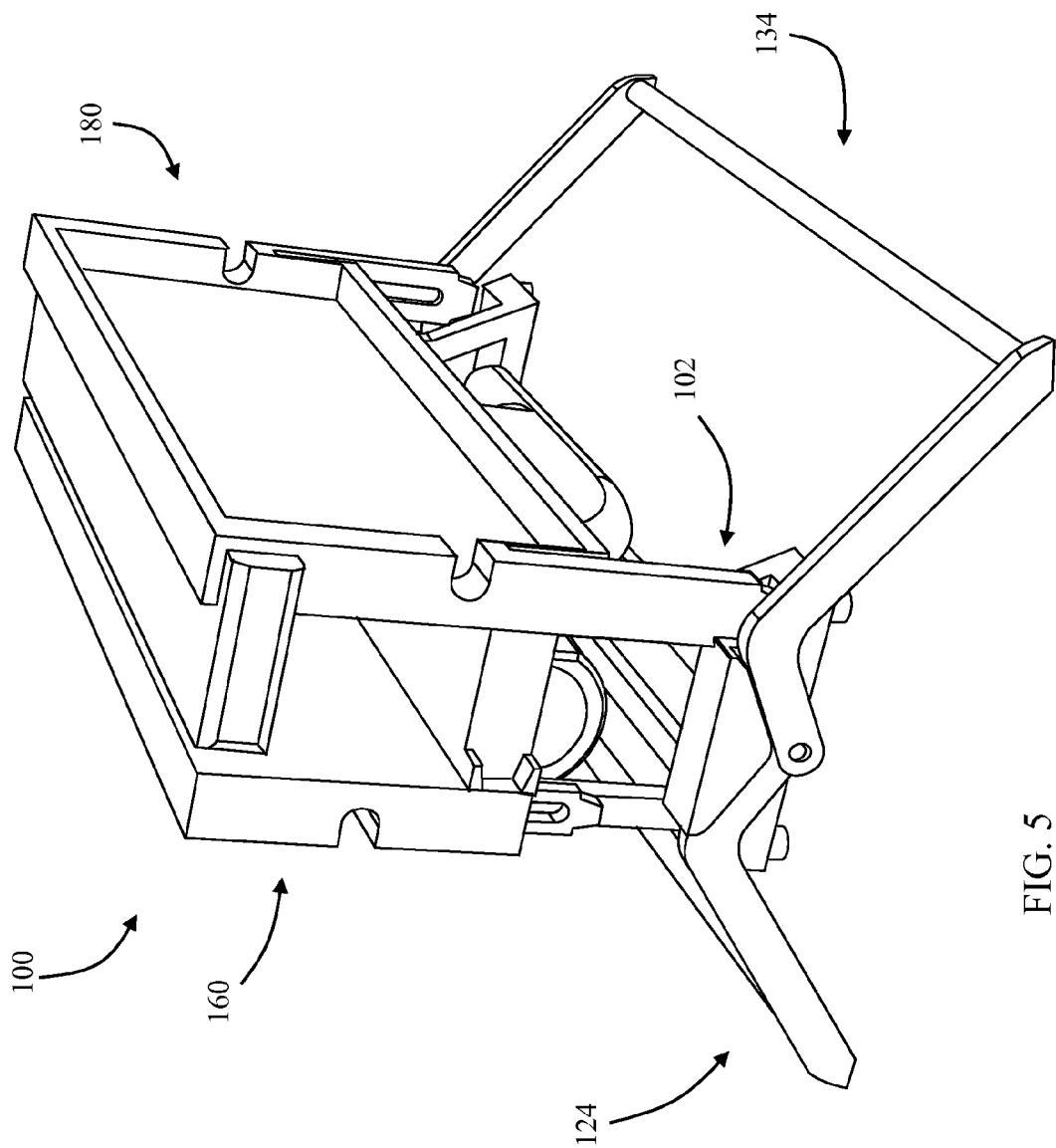
FIG. 5 depicts a top right perspective view of the table saw assembly of FIG. 1 in an intermediate configuration.

After the extension 160 and the extension 180 are pivoted relative to the base portion 102, the table saw assembly is configured as shown in FIG. 5. To continue to move the table saw assembly 100 into the stowed configuration (shown in FIG. 4), the leg assemblies 124, 134 are then rotated relative to the base portion 102. Because the cross bar length 138 of leg assembly 134 (shown in FIG. 2) is greater than cross bar length 128 of leg assembly 124 (shown in FIG. 2), and the front leg 134a and back leg 134b (shown in FIG. 2) are longer than the front leg 124a and back leg 124b (shown in FIG. 2), the leg assembly 134 passes outside of the leg assembly 124 as the leg assemblies 124, 134 pivot relative to the base portion 102.

Referring again to FIG. 4, the leg assembly 124 pivots about the pivots 120 (shown in FIGS. 2 and 3). As the leg assembly 124 pivots, the leg support surfaces 129 (shown in FIG. 2) are removed from contact with the stop surfaces 155 on the stop blocks 152 (shown in FIGS. 2 and 3). The pivoting of the leg assembly 124 is limited by reception of the cross bar 127 within the leg assembly reception areas 189 on the extension 180 (shown in FIG. 3). Similarly, the leg assembly 134 pivots about the pivots 120 (shown in FIGS. 2 and 3). As the leg assembly 134 pivots, the leg support surfaces 139 (shown in FIG. 2) are removed from contact with the stop surfaces 154 on the stop blocks 152 (shown in FIGS. 2 and 3). The pivoting of the leg assembly 134 is limited by reception of the cross bar 137 within the leg assembly reception areas 169 on the extension 160 (shown in FIG. 3).

When desired, the table saw assembly 100 is movable from the stowed configuration (shown in FIG. 4) to the deployed configuration (shown in FIG. 1) by reversing the process described above.

The table saw assembly 100 provides a table saw having a foldable tabletop and foldable legs configured in a manner that enables the table saw assembly 100 to move between a deployed configuration, in which a work piece is supported on a large area comprising the base work piece support surface 104 and the extension work piece support surfaces 162, 182, and a stowed configuration, in which the table saw assembly 100 is folded into a compact shape that is easy to store and transport. Because both the tabletop and the legs are foldable, the footprint of the table saw assembly 100 in the stowed configuration is substantially the same size as the footprint of the base portion 102 alone. Additionally, the blade and guard protection cavity 199 formed when the table saw assembly 100 is in the stowed configuration prevents a user from having to adjust or remove the saw blade 115 or blade guard between uses, saving time and effort without risking damage to the saw blade 115 or guard or injury to the user.

The foregoing detailed description of one or more embodiments of the foldable tabletop for table saws has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems, or applications. Presently unforeseen or unanticipated alternatives, modifications, variations or improvements therein may be subsequently made by those skilled in the art which are also intended to be encompassed by the appended claims. Therefore, the spirit and scope of any appended claims should not be limited to the description of the embodiments contained herein.

What is claimed is:

1. A table saw assembly, comprising:
a base portion including a base work piece support surface defining a support plane, and a lower surface;
a saw blade opening defined in the base work piece support surface;
a saw assembly including a saw blade positionable to extend upwardly through the saw blade opening;
a first leg assembly including a first foot portion, the first leg assembly pivotably attached to the base portion by a first pivot so as to be pivotable between a first position whereat the first foot portion is positioned lower than the lower surface of the base portion and a second position whereat the first foot portion is positioned above the support plane; and
a stop mechanism configured to arrest the first leg assembly in the first position, the stop mechanism comprising a first stop block fixedly positioned on the base portion,
wherein a first portion of the first leg assembly contacts a first stop surface of the first stop block to arrest the first leg assembly in the first position.

2. The table saw assembly of claim 1, further comprising:
a second leg assembly including a second foot portion, the second leg assembly pivotable between a third position whereat the second foot portion is positioned lower than the lower surface of the base portion and a fourth position whereat the second foot portion is positioned above the support plane, wherein
a second portion of the second leg assembly contacts a second stop surface to arrest the second leg assembly in the third position.

3. The table saw assembly of claim 2, wherein the stop mechanism comprises the second stop surface.

4. The table saw assembly of claim 2, wherein:
the first leg assembly includes a third foot portion;
the third foot portion is positioned lower than the lower surface of the base portion when the first leg assembly is in the first position;
the third foot portion is positioned above the support plane when the first leg assembly is in the second position;
the second leg assembly includes a fourth foot portion;
the fourth foot portion is positioned lower than the lower surface of the base portion when the second leg assembly is in the third position; and
the fourth foot portion is positioned above the support plane when the second leg assembly is in the fourth position.

5. The table saw assembly of claim 4, wherein:
the first leg assembly and the second leg assembly are pivotably attached to the base portion by a second pivot;
the stop mechanism comprises a second stop block fixedly positioned on the base portion;
a third portion of the first leg assembly contacts a third surface of the second stop block to arrest the first leg assembly in the first position; and
a fourth portion of the second leg assembly contacts the fourth surface of the second stop block to arrest the second leg assembly in the third position.

6. The table saw assembly of claim 1, further comprising:
a first extension including a first extension work piece support surface pivotable with respect to the base portion between a first extension position whereat the first extension work piece support surface is coplanar with the base work piece support surface and a second extension position whereat at least a portion of the first extension work piece support surface is located above the support plane and is not coplanar with the support plane.

7. The table saw assembly of claim 6, further comprising:
a second leg assembly including a second foot portion, the second leg assembly pivotable between a third position whereat the second foot portion is positioned lower than the lower surface of the base portion and a fourth position whereat the second foot portion is positioned above the support plane;
a second extension including a second extension work piece support surface pivotable with respect to the base portion between a third extension position whereat the second extension work piece support surface is coplanar with the base work piece support surface and a fourth extension position whereat at least a portion of the second extension work piece support surface is located above the support plane and is not coplanar with the support plane.

8. The table saw assembly of claim 7, wherein:
the first extension is pivotably connected to the base portion by a pin and slot configuration.

9. The table saw assembly of claim 1, wherein
the first stop block is fixedly positioned on the base portion at a location above the first pivot.

10. A table saw assembly, comprising:
a base portion including an upper base work piece support surface defining a support plane, and a first lower most portion;
a saw blade opening defined in the base work piece support surface;
a saw assembly including a saw blade positionable to extend upwardly through the saw blade opening;
a first leg assembly including a second lower most portion, the first leg assembly pivotable between a first position whereat the second lower most portion is positioned lower than the first lower most portion and a second position whereat the second lower most portion is positioned above the first lower most portion; and
a second leg assembly including a third lower most portion, the second leg assembly pivotable between a third position whereat the third lower most portion is positioned lower than the first lower most portion of the base portion and a fourth position whereat the third lower most portion is positioned above the first lower most portion of the base portion, wherein:
the first leg assembly and the second leg assembly are pivotably attached to the base portion by a first pivot.

11. The table saw assembly of claim 10, further comprising:
a stop mechanism configured to arrest the first leg assembly in the first position.

12. The table saw assembly of claim 11, wherein;
the stop mechanism comprises a first stop block fixedly positioned on the base portion at a location above the first pivot; and
a first portion of the first leg assembly contacts a first surface of the first stop block to arrest the first leg assembly in the first position.

13. The table saw assembly of claim 12, wherein:
the first leg assembly and the second leg assembly are pivotably attached to the base portion by a second pivot; and
the stop mechanism comprises a second stop block fixedly positioned on the base portion at a location above the first pivot.

14. The table saw assembly of claim 11, further comprising:
- a first extension including a first extension work piece support surface pivotable with respect to the base portion between a first extension position whereat the first extension work piece support surface is coplanar with the base work piece support surface and a second extension position whereat at least a portion of the first extension work piece support surface is located above the support plane and not coplanar with the support plane.

15. The table saw assembly of claim 14, further comprising:
- a second extension including a second extension work piece support surface pivotable with respect to the base portion between a third extension position whereat the second extension work piece support surface is coplanar with the base work piece support surface and a fourth extension position whereat at least a portion of the second extension work piece support surface is located above the support plane and not coplanar with the support plane.

16. The table saw assembly of claim 15, wherein:
the first extension is pivotably connected to the base portion by a pin and slot configuration.

* * * * *